Jan. 5, 1943.    W. M. BAILEY    2,307,561
TERMINAL CONSTRUCTION FOR ELECTRICAL DEVICES
Filed Jan. 5, 1940

INVENTOR.
William M. Bailey
BY
ATTORNEY.

Patented Jan. 5, 1943

2,307,561

UNITED STATES PATENT OFFICE 2,307,561

TERMINAL CONSTRUCTION FOR ELECTRICAL DEVICES

William M. Bailey, Tuckahoe, N. Y., assignor to Cornell-Dubilier Electric Corporation, South Plainfield, N. J., a corporation of Delaware Application January 5, 1940, Serial No. 312,466

6 Claims. (Cl. 174—152)

This invention relates to electrical devices such as condensers and more particularly to improved means for and a method of providing a hermetic seal between the terminals and the metallic casing housing a condenser unit or other electrical device.

Heretofore, leadout terminals for electrical condensers have been passed through the metal casing by way of a screw or rivet insulatingly mounted in a wall of the casing. The screw or rivet is held in a central position by means of insulating washers of cork, Bakelite or the like cemented to the casing with a lacquer or varnish. Such a condenser terminal mount has failed to properly seal the casing and protect it against the intrusion of moisture from the atmosphere. Even though the casing may be properly sealed at the time of manufacture, a certain degree of cold flow or shrinking of the Bakelite, cork, rubber or the like, as well as mechanical stress exerted on the terminal tends to loosen the terminal joint, thus impairing or destroying the seal.

It is an object of the present invention to overcome the above drawbacks and provide a terminal mount for electrical condensers and other electrical devices insuring a permanent hermetic seal between the enclosing casing and the terminals of a condenser unit or other electrical device.

Figure 1:
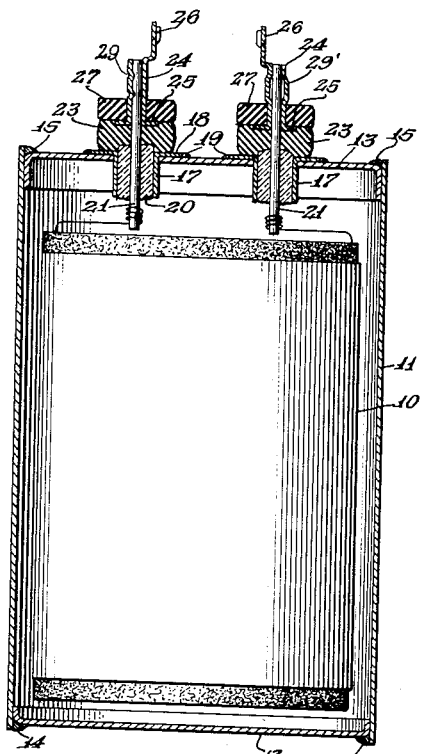
Figure 2:
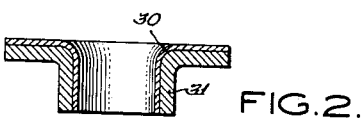

Other objects and advantages of the invention will become apparent as the following detailed description proceeds taken with reference to the accompanying drawing forming part of this specification and wherein;

Figure 1 is a cross-sectional view of a condenser embodying a terminal mount constructed according to the invention, Figure 2 is an enlarged cross-section of a metal element for use in a modified terminal construction according to the invention, Figures 3-7 are partial views showing further modifications of terminal mounts according to the invention.

Like reference numerals identify like parts throughout the different views of the drawing.

Referring more particularly to Figure 1, I have shown a condenser unit 10 of the known rolled or any other suitable type mounted in a metallic casing 11 having a bottom wall 12 and a top wall or cover 13 hermetically secured to the side walls of the container in any suitable manner such as by welding or soldering as shown at 14 and 15, respectively. The top wall or cover 13 is provided with holes therein through which are passed metal eyelets or sleeves 17 having a flange 18 overlying the outer surface of the top wall adjacent to the holes. The flange 18 is hermetically secured to the cover 13 such as by soldering or welding as shown at 19. A conductor 21 is centrally disposed within the eyelet 17 and insulated therefrom by a body of insulating material 20 completely filling the inner space of and intimately bonded to the inside wall of the eyelet. Leads from the electrodes of the condenser unit 10 are electrically connected to the conductor 21 such as by soldering or in any other suitable manner. A resilient washer 23 of rubber or the like having a central hole is placed over the extending portion of the conductor 21 in contact with the insulating body 20 and the top face of the eyelet flange 18. The extending conductor is further passed through an eyelet terminal or sleeve 24 closely fitting over the conductor and having a flange 25 at its lower end in contact with the resilient washer 23 and having its opposite end 26 adapted to be soldered or otherwise connected to a conductor in an electrical circuit. A further washer 27 of substantially rigid insulating material such as porcelain, Bakelite, fibre-board or the like, having a central hole surrounds the terminal sleeve 24 in contact with the upper face of flange 25. The terminal sleeve 24 is electrically and mechanically secured to the conductor 21 in any suitable manner such as by crimping and pinching the sleeve 24 as shown at 29 and 29', respectively.

In assembling the terminal structure, the conductor 21 is threaded through the resilient washer 23, the terminal sleeve 24 and the insulating washer 27, whereupon pressure is exerted against the outer face of the washer 27 to compress the resilient washer 23 and while maintaining the washer in the compressed condition the pinching and crimping of the sleeve 24 is carried out. In this manner a terminal mount is obtained which, while ensuring a strong mechanical connection between the casing and the terminal conductor affords adequate relief for the joint between the conductor 21 and sleeve 17 and the insulating material 20 from bending and other stresses exerted upon the conductor or terminal mount during shipping and handling of the condenser. The flange 25 of the sleeve 24 may be formed thereon after the terminal is inserted through the central hole of the washer 27. Preferably, however, the eyelet terminal 24 is molded in a washer or other member of thermoplastic material prior to the assembly such as shown more clearly in Figure 3.

The insulating material 20 consists preferably of a soft glass or a ceramic compound capable of flowing easily and of producing a firm bond with the inner wall surface of the eyelet 17 and with the conductor 21. In order to effect a firm bonding of the inner surface of the eyelet 17 to the insulating material 20, the eyelet 17 consists of a suitable metal or metal alloy having substantially the same temperature coefficient of expansion as the insulating material, or alternatively, since such metals are expensive, the eyelet may be formed from a bi-metallic sheet metal such as shown in Figure 2; this bi-metallic element being composed of a stronger outer sheet 31 of comparatively cheaper metal and a thin inner layer 30 of platinum or a metallic alloy having the aforementioned characteristics for insuring an efficient seal and bond between the eyelet and the insulating material 20. The conductor 21 may consist of the same material as the eyelet 17 or the layer 30 or it may also be of bi-metallic construction comprising an inner core of relatively cheap metal such as copper or the like coated with a layer of platinum or its equivalent in substantially the same manner as the bi-metallic eyelet as shown in Figure 2. The outer metal 31 may suitably be copper, nickel, iron or other non-expensive metal or metal alloy which can be easily tinned and soldered to the cover 13 of the casing 11.

Suitable alloys for the inner layer of the eyelet 17 or, if desirable, for the entire eyelet in case the insulating material 20 is of glass or other fusible ceramic or vitreous material are known under the trade names Kovar, Fernico or Dumeit. I have found, however, that a bi-metallic sheet comprising a thin layer of platinum presents special advantages due to the relatively small quantity of platinum required in producing such a bi-metallic strip. The bi-metallic strip may suitably be made by welding together a strip of copper, nickel or the like with a substantially thinner strip of platinum and then rolling the composite strip to the desired thickness. Alternatively, the first metal strip may be plated on one side with a thin layer of platinum electrolytically or by a chemical reduction process of platinum salts. For the latter process platinum chloride may be pulverized and mixed with about two parts its weight of an aromatic oil such as Rosemary oil, lavender oil or the like to produce a paint compound which is applied to the base metal surface by means of a brush or a suitable spraying device. The painted base metal sheet is then subjected to a gradual increase in temperature up to approximately 400° C. whereupon the resulting platinum layer will be found to be intimately bonded to the base metal. I found it desirable in some cases to add during the preparation of the paint a small quantity of gold chloride to facilitate the subsequent tinning of the metal layer. Gold chloride up to 25% of the quantity of the platinum chloride may advantageously be used for this purpose.

It will be apparent that the paint solution may be applied either to the base metal sheet or to the pre-fabricated eyelet. The platinum surfaced eyelet of Figure 2 or the single eyelet of Figure 1 are firmly bonded to the insulating glass or ceramic material 20 by passing the platinum or alloy conductor 21 centrally through the eyelet 17 and inserting over the conductor 21 a pre-fabricated washer or sleeve 20 of glass or other insulating material and, while maintaining the conductor 21 centrally disposed in the eyelet 17, applying a sufficient amount of heat to fuse the insulating material 20 and cause it to flow into the eyelet 17 and around the conductor 21. A suitable temperature for fusing the insulating material 20 when using soft glass is from about 800° C. to 900° C. It will be found that the insulating material is intimately bonded to the inner surface of the eyelet and to the conductor 21. When a bi-metallic element is used, the advantage is obtained that due to the contraction of the base metal of the eyelet on cooling, additional mechanical strength is imparted to the seal.

Although there may be sufficient mechanical rigidity between the eyelet 17, insulating material 20, and the conductor 21, the projecting portion of the conductor 21 may be easily loosened and the seal broken by excessive bending or other stresses inadvertently exerted upon the conductor during shipping and handling. In order to overcome this disadvantage, there are provided in the construction according to Figure 1 the resilient washer 23, the terminal eyelet 24 and the insulating washer 27 arranged and mounted as described hereinabove. It will be apparent that by a construction of the type shown in Figure 1 substantially no bending stresses are transmitted from the extending portion of the conductor 21 to the seal or joint between the conductor and the insulating mass 20.

Figure 3:
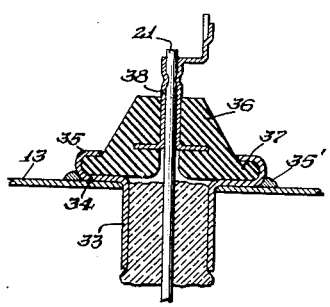

In Figure 3 I have shown a further modification of a terminal construction adapted to eliminate the effect of bending stress exerted upon the conductor 21. A bi-metallic or unitary metal eyelet 33 having a flange 34 terminating in an upturned portion 35, is secured to the cover 13 in a suitable manner such as by welding or soldering as shown at 35' and a pre-molded terminal member 36 of Bakelite or other plastic material having a bead or flange 37 and provided with a central hole for passing the extending portion of the terminal rod or conductor is secured to the casing by spinning or rolling the edge 35 of the eyelet flange into mechanical engagement with the bead or flange 37 of the member 36. The latter has a terminal sleeve 38 firmly molded therein and being in contacting engagement with the extending portion of the conductor 21. The terminal 38 shown in Figure 3 is similar to that according to Figure 1 and the electrical connection is shown to be obtained by crimping the sleeve 38 as previously described. As is understood, other types of terminals may be used and the electrical connection may be effected by soldering or welding the terminal to the conductor 21.

Figure 4:
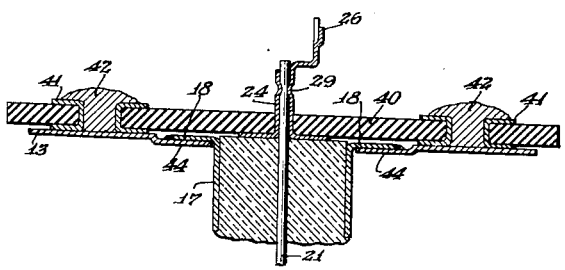

In Figure 4, I have shown a modified arrangement for mechanically securing a terminal sleeve 24 to the conductor 21. The Bakelite or porcelain strip 40 has holes provided therein in which are mounted eyelets 41 having outer and inner flanges firmly pressed against the top and bottom surface of the strip. The base of the eyelets rests against the outer top surface of cover 13 and the space within the eyelets is filled with solder 42 to afford a firm mechanical connection with the cover 13. As is understood, the strip 40 may be secured to the cover 13 in any other suitable manner insuring a firm and liquid-tight connection. A hole is provided in the insulating strip for passage of the terminal conductor 21. In order to properly connect the cover 13 with the base of the eyelet 41 the portion adjacent to the hole in the cover 13 is offset or depressed inwardly to receive the flange 18 of the eyelet 17 secured thereto and serving the same purpose as in the preceding constructions.

Figure 5:
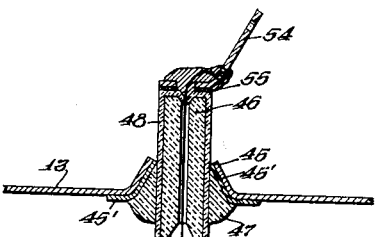

According to a further modification of the invention, the cover of the casing is extruded thus replacing and dispensing with the eyelet previously described. Such an arrangement is shown in Figure 5, wherein the cover 13 is provided with an extending tapering neck 45 obtained by outwardly bending at an angle the edge portion of the circular opening in the cover 13. The bent portion 45 is coated on its inside with a layer 45' of a metal or alloy such as platinum having substantially the same coefficient of expansion as glass or other insulating material previously described. A porcelain member 46 having a hole therethrough is inserted in the extruded neck 45—45' in the cover 13 and an insulating compound 47 such as soft glass is applied in fused condition forming a fillet surrounding the terminal and after cooling being in bonded relation with the glazed surface 48 of the porcelain member 46 on the one hand and with the inner layer 45' of the extruded neck 46 on the other hand. This may be accomplished as previously described in connection with Figure 2.

Figure 6:
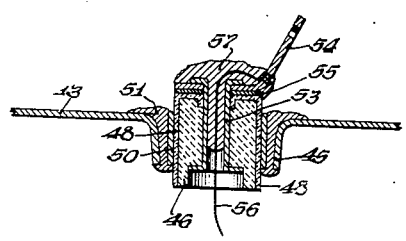

Alternatively, a metallic layer may be applied to the glaze of the porcelain member such as shown in the embodiment according to Figure 6. In the latter, the porcelain member 46 having a centrally disposed hole and a glazed surface 48 is coated with a metallic layer 50 such as by painting with platinum gold paint compound and treatment previously described. The plated porcelain terminal may be subjected to a temperature of about 800° C. whereby the metal layer 50 will be bonded on to the glaze 48. The metal layer 50 may be tinned with ordinary solder and subsequently soldered in the extruded neck 45 in the cover 13. The extruded neck is shaped in such a manner that a reasonably large fillet of solder 51 will result in a mechanically strong joint between the porcelain member 46 and the cover 13. A metal eyelet 53 is passed through the central hole of the member 46 and through a suitable terminal lug 54 and thereafter rolled or spun over to secure a mechanically strong joint between a second platinum gold metal layer 55 suitably insulated from the metal layer 50. A terminal conductor 56 serves for electrically connecting a condenser electrode with the terminal 54 and is passed through the eyelet 53 and wrapped around the terminal 54. Thereupon, the entire top of the terminal assembly is hermetically bonded together and the hole in the eyelet 53 by applying a mass of solder 57.

Figure 7:
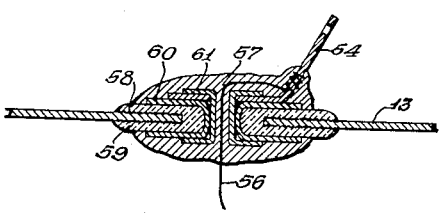

According to a modification of Figure 6, the porcelain insulator may be directly applied to the container as shown in Figure 7, wherein the cover 13 is provided with a hole and a circular area 58 surrounding the hole is suitably roughened by etching, sandblasting or the like. The roughened surface is coated with a glaze or enamel 59 applied thereto and suitably fired to bond the enamel to the cover 13. Such a process of enameling may be similar to the commercial processes used in the manufacture of domestic enamelware. A metal layer 60 is then applied to the enamelled surface 59 in a manner previously described in connection with Figure 6 and suitably tinned. An eyelet 61 is inserted through the hole in the container and through the hole in terminal 54 and suitably spun or pressed into mechanical engagement with both the inner and outer faces of the cover 13. A terminal wire 56 is attached to the terminal 54 in a manner similar to that described in connection with Figure 6 and the entire assembly covered with solder to effect a hermetic bonding of the terminal to the casing.

It will be evident from the above that the invention is not limited to the specific construction and details shown and described herein for illustration, but that the underlying idea and principle are susceptible of numerous variations and modifications coming within the broad scope of the invention as defined in the appended claims. The specification and drawing are to be regarded therefore in an illustrative rather than a limiting sense.

I claim:

1. A terminal construction for electrical devices mounted in a metal container comprising a metallic sleeve having a flange secured to an opening provided in a wall of the container, said sleeve projecting into said container, an electrical conductor passing through said sleeve and projecting outwardly from said container, a body of fused insulating material hermetically filling the space within said sleeve and around said conductor, at least the contacting surfaces of said sleeve and conductor with said body consisting of a metal having substantially the same coefficient of expansion as said insulating material, a first resilient washer surrounding the projecting portion of said conductor and overlying said flange and insulating body, a second rigid washer overlying and pressed against said resilient washer, and a sleeve fitting over the extending portion of said conductor and having a flange interposed between said washers, said sleeve being deformed into mechanical engagement with said conductor to hold said first washer in compressed engagement.

2. In a terminal mount construction as claimed in claim 1, said sleeve being crimped inwardly and pinched outwardly to effect mechanical connection with said conductor.

3. A terminal construction for electrical devices mounted in a metal container, comprising a tubular extension from an opening in a wall to the interior of said container, an electrical conductor passing through said extension from the inside to the outside of said container, a filling of insulating material fused to said extension and said conductor to provide a hermetic seal, at least the surfaces of said extension and of said conductor in contact with said insulating material having substantially the same coefficient of thermal expansion as said insulating material, a first resilient washer surrounding the projecting portion of said conductor in contact with the outer surface of said filling and the adjacent portions of said container, a second rigid washer overlying and pressing against said resilient washer, and a sleeve fitting over the extending portion of said conductor and having a flange clamped between said washers, said sleeve being deformed into mechanical engagement with said conductor to hold said first washer in compressed condition.

4. A terminal structure for electrical devices housed in a metal container comprising a sleeve extending from an opening in a wall into the interior of said container, an electrical conductor passing through said sleeve from the inside to the outside of said container, insulating material hermetically sealing said conductor to said sleeve, at least the inner surface of said sleeve and said conductor in contact with said insulating material having substantially the same coefficient of thermal expansion as said insulating material, a first resilient washer surrounding the projecting portion of said conductor in contact with the adjacent portions of said container, a second rigid washer overlying and pressing said first washer against said casing, and a sleeve fitting over the extending portion of said conductor and being deformed into mechanical engagement with said conductor to hold said washers in compressed condition.

5. A terminal structure for electric devices housed in a metal container comprising a sleeve extending from an opening in a wall into the interior of said container, an electrical conductor passing through said sleeve from the inside to the outside of said container, insulating material hermetically sealing said conductor to said sleeve, said sleeve having a relatively thick outer portion and a thin inner layer of metal having substantially the same coefficient of thermal expansion as said insulating material, a first resilient washer surrounding the projecting portion of said conductor in contact with the adjacent portions of said container, a second rigid washer overlying and pressing said first washer against said casing, and a sleeve fitting over the extending portion of said conductor and being deformed into mechanical engagement with said conductor to hold said washers in compressed condition.

6. A terminal structure for electrical devices mounted in a metal container comprising a sleeve extending from an opening in a wall into the interior of said container, an electrical condutcor passing through said sleeve from the inside to the outside of said container, a filling of soft glass hermetically sealing said conductor to said sleeve, said sleeve having a relatively thick outer portion and a thin inner layer of platinum, a first resilient washer encircling the projecting portion of said conductor in contact with the adjacent portions of said container, a second rigid washer overlying and pressing said first washer against said casing, and a sleeve fitting over the extending portion of said conductor and being deformed in a mechanical engagement therewith to hold said first washer in compressed condition.

WILLIAM M. BAILEY.